United States Patent
Grossman

[15] 3,654,003
[45] Apr. 4, 1972

[54] METHOD OF MOLDING HOLLOW ARTICLE WITH MOLDED-IN FASTENER

[72] Inventor: Morris Gary Grossman, Wyckoff, N.J.
[73] Assignee: Peter's Bag Corporation, New York, N.Y.
[22] Filed: May 14, 1969
[21] Appl. No.: 824,508

[52] U.S. Cl. ................................156/66, 156/90, 156/245, 156/248, 156/250, 264/139, 264/310
[51] Int. Cl. ..........................................B32b 1/04
[58] Field of Search ....................264/310, 311, 138, 139; 156/66, 90, 245, 248, 250

[56] References Cited

UNITED STATES PATENTS

| | | | |
|---|---|---|---|
| 3,081,493 | 3/1963 | Beyer-Olsen et al. | 264/310 |
| 3,368,707 | 2/1968 | Johnson et al. | 264/138 |

Primary Examiner—Robert F. White
Assistant Examiner—J. R. Hall
Attorney—Blum, Moscovitz, Friedman & Kaplan

[57] ABSTRACT

A method for molding a fastener, such as a zipper, or other material, device or attachment into a hollow article such as a bag for making the fastener or device an integral part of the bag while protecting the fastener elements during the molding operation. The technique of the invention is especially suitable where the bag or other article is formed by the technique of roto-molding.

6 Claims, 7 Drawing Figures

Patented April 4, 1972

INVENTOR.
MORRIS GARY GROSSMAN

BY
Blum, Moscovitz, Friedman & Kaplan

ATTORNEYS

Patented April 4, 1972

INVENTOR.
MORRIS GARY GROSSMAN

BY
Blum, Moscovitz, Freedman & Kaplan
ATTORNEYS 3,654,003

METHOD OF MOLDING HOLLOW ARTICLE WITH MOLDED-IN FASTENER

BACKGROUND OF THE INVENTION

In the prior art, it is known to mold articles, such as satchels and other bags by the technique of roto-molding by placing a quantity of flowable plastic material within a mold and slowly rotating the mold, usually in an oven, so as to cause the plastic to flow evenly along the surface of the mold to set into a hollow bag whose exterior configuration precisely follows the interior configuration of the mold cavity. After the plastic has set, the bag is stripped from the mold. If it is desired to apply a fastener, closure, handle or other attachment to the molded bag, present techniques required that the attachment, such as the zipper, be subsequently sewn or heat sealed to the bag to form a closure through which access may be had to the interior of the bag.

SUMMARY OF THE INVENTION

Generally speaking, in accordance with the invention, means are provided for securing an attachment, such as a closure to the bag during the molding operation to avoid the necessity for separately securing the attachment subsequent to the molding operation. Means are also provided to protect portions of the attachment from the flowable plastic material during the roto-molding operation in order that the attachment (zipper teeth and surrounding material, for example) not be gummed up or rendered unattractive or inoperable by the flowable plastic material.

Accordingly, it is an object of this invention to provide an improved technique for securing an attachment to a hollow molded article.

A further object of the invention is to provide an improved method for securing an attachment to a hollow molded article during the molding of the article.

A further object of the invention is to provide a method for permitting a closure to be cleanly secured to a hollow molded article during the molding of the article.

Still other objects and advantages of the invention will in part be obvious and will in part be apparent from the specification.

The invention accordingly comprises the several steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

In molding a closure such as a zipper, in situ during the formulation of a hollow article by the rotational molding or roto-molding technique, it is apparent that the flowable plastic material from which the article is to be formed in the mold will coat all exposed surfaces and objects. If the closure elements, such as the zipper teeth, are completely exposed, the flowable plastic will gum up the teeth and also impart a messy appearance to the article in the area of the zipper. To overcome such drawbacks and to permit the zipper to be molded in situ, a supporting member 11 is provided which preferably completely encircles the zipper and is secured to portions thereof. The supporting member 11 shown in FIG. 1 consists of at least one and preferably two layers of vinyl which have been injection molded, vacuum formed or heat sealed and heat sealed to the zipper.

Figure 3:
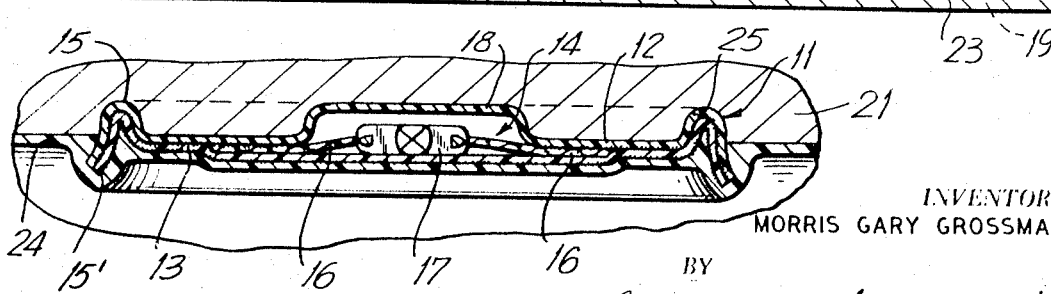
FIG. 3 is a partial sectional view, at an enlarged scale, taken along line 3—3 of FIG. 2.

As best shown in FIG. 3, supporting member 11 preferably consists of a top layer 12 and a bottom layer 13 which have been heat sealed to the zipper 14. The peripheral edge of supporting member 11 is formed into a lip 15 for mounting the supporting member in the mold, as will be hereafter described. Zipper 14 is received between top and bottom layers 12 and 13 and the zipper tapes 16 are closely engaged by the top and bottom layers. Zipper teeth 17 are located in an intermediate area in which the top layer has a raised portion 18 to accommodate the zipper teeth. Outwardly of raised portion 18, the top and bottom layers 12 and 13 are heat sealed together to thereby seal the top and bottom layers as an integral unit and to seal zipper tape 16 as part of the supporting member between the top and bottom layers.

Figure 1:
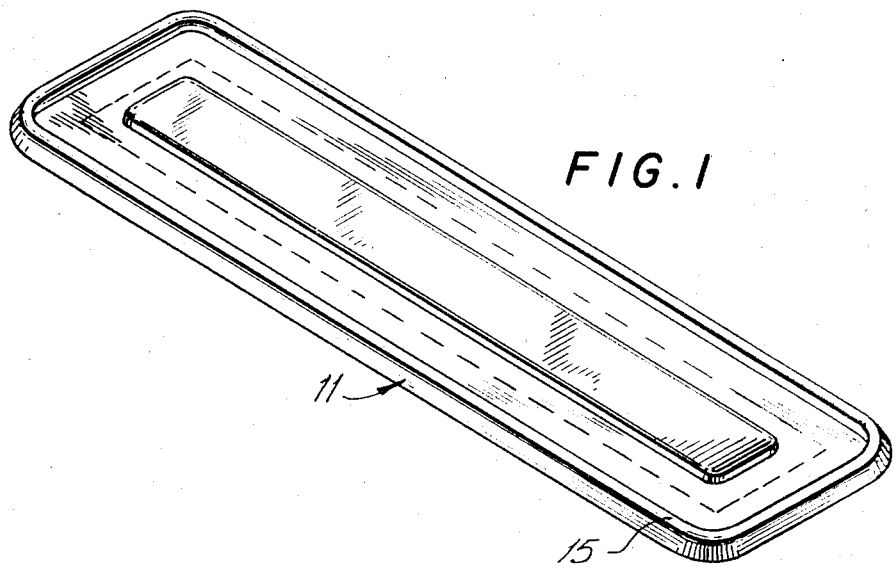
FIG. 1 is a perspective view of an attachment supporting member constructed in accordance with a preferred embodiment of the instant invention.

The supporting member 11 shown in FIG. 1 has a zipper sealed therein as indicated by the dotted outline of the zipper tapes. The zipper remains sealed in the supporting member throughout the molding operation.

Figure 2:
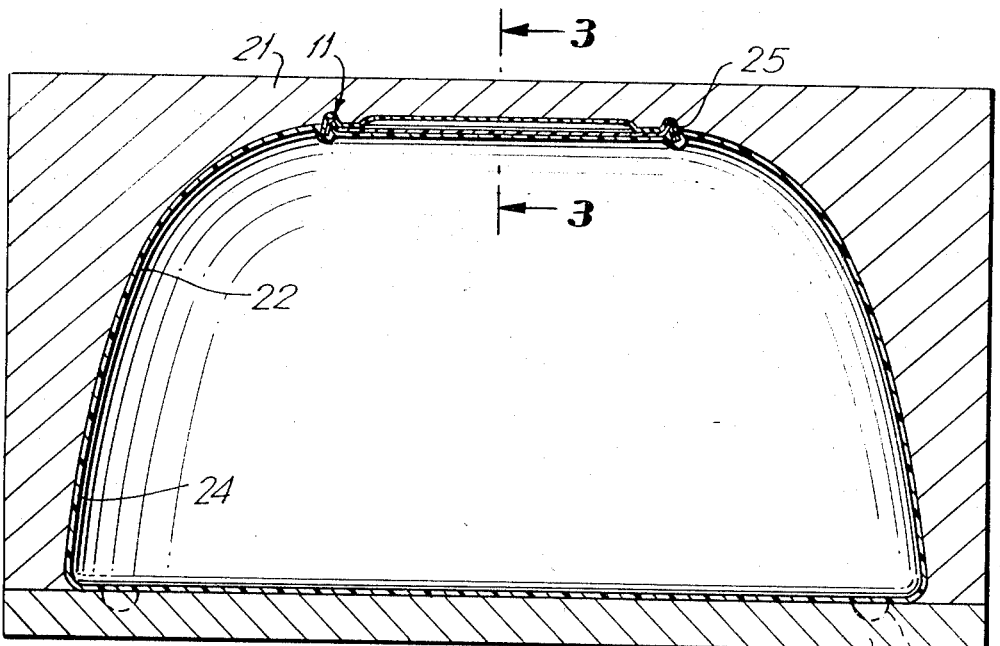
FIG. 2 is a sectional view of a mold with an attachment supporting member in place and with the wall of a bag formed on the inner surface of the mold cavity.

Referring now to FIGS. 2 and 3, mold 21 is formed with a cavity 22 having the configuration of the external surface of the bag or satchel to be produced therein. The open end of the mold is covered by a plate 23 in order to close the mold. As is known in the technique of roto-molding, a charge of flowable plastic is inserted in the mold, the mold is closed, and the mold is thereafter slowly rotated about all axes, usually within an oven, to cause the plastic material to evenly coat the walls of the mold and form the hollow bag. The plastic material of the bag is indicated at 24. The mold cavity is provided with an groove 25 which closely receives lip 15 of supporting member 11 to accurately position the supporting member within the mold and secure it in the mold during the molding operation. The supporting member is mounted in the mold cavity while the mold is open and before the charge of plastic has been placed in the mold.

During the molding operation, the plastic will completely coat the surface of the mold cavity and the exposed inner surface of supporting member 11. In the art of roto-molding, the entire mold 21 with its plate 23 is heated in an oven to set the plastic. The setting of the plastic is accomplished by the heating of the surface of the mold cavity resultant from conduction of heat through the mold and plate material. In the area of zipper teeth 17, it can be seen that the plastic material flowing over the supporting member will be insulated from the heated surface of the mold and thus the plastic material coating the supporting member in the area of the zipper will not set and can be subsequently removed. However, the remaining portion of the mold material will set of form a plastic bag and will form about and weld to the peripheral edge or skirt 15' of supporting member 11 as clearly shown in FIG. 1. This will impart a neat and finished appearance to the bag and secure the supporting member and zipper as an integral part of the molded bag.

When the molding operation is completed, the mold is removed from the oven and cooled and, thereafter, plate 23 is removed to permit the hollow bag to be stripped from the mold.

Figure 4:
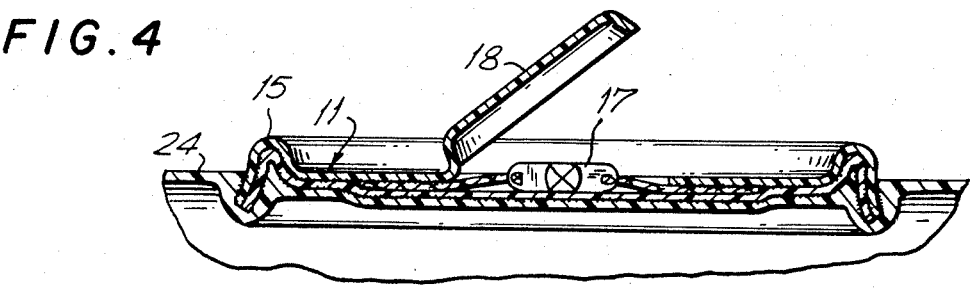
FIG. 4 is a partial sectional view of the bag and closure with the protective covering for the closure being partially removed.

A portion of the bag in the area of supporting member 11 is shown in FIG. 4. When the bag is removed from the mold, the zipper is covered by raised portion 18. Thereafter, the raised portion is stripped from the supporting member to expose the clean zipper.

Figure 5:
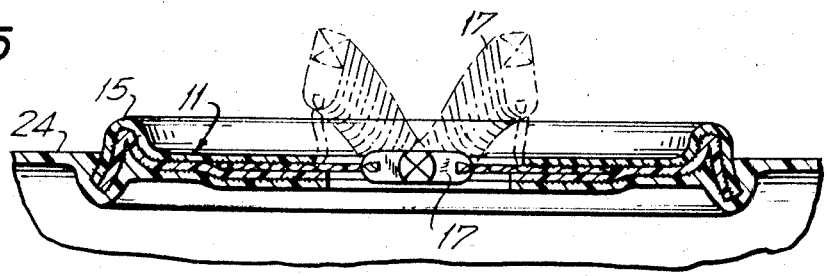
FIG. 5 is a partial sectional view similar to FIG. 4 wherein the closure is a zipper with the zipper shown partially open in phantom lines.

The zipper may be opened as indicated in FIG. 5 and the portion of bottom layer 13 is then cut to permit entry into the interior of the bag through the zipper. Any unset plastic may be cleaned away from the interior but this in no way affects the neat and finished appearance of the bag exterior.

In forming supporting member 11, bottom layer 13 may be omitted and the zipper tapes heat sealed directly to the undersurface of top layer 12 with a raised portion 18 being provided to clear the zipper teeth. The supporting member is secured in the mold in the manner previously described and molding takes place as aforesaid. During molding, some of the flowable plastic material will coat the interior surface of the zipper tapes and teeth. However, such plastic material will be insulated from the heated surface of the mold by the presence of the clearance defined by raised portion 18 and thus the plastic material in the area of the zipper teeth will not fully set. After the bag has been stripped from the mold and raised portion 18 removed, the zipper can be opened and the unset plastic material will flake away or can be cleaned away. Omission of bottom layer 13 will not detract from the finished external appearance of the bag since the exterior of the zipper teeth will not have been coated with plastic material.

Note that, as shown in FIG. 2, feet 19 can be formed as part of the bag by appropriate cavities in plate 23.

Figure 6:
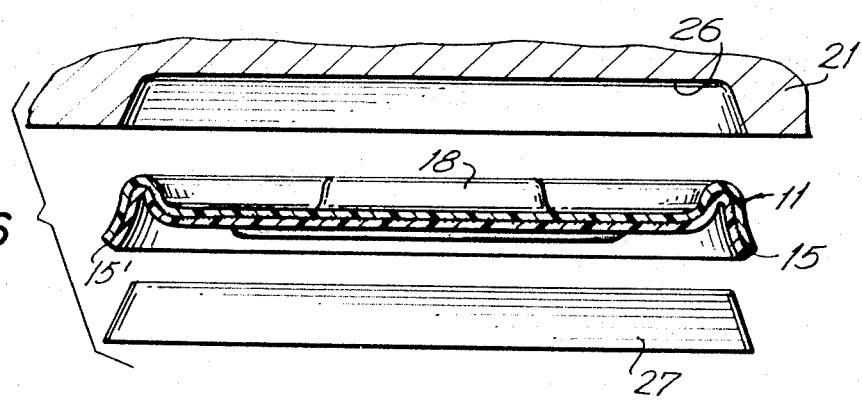
FIG. 6 is an exploded, partial sectional view of an alternate form of mold arrangement showing means for mounting the attachment supporting member in the mold.

Referring now to FIG. 6, the cavity of mold 21 can be provided with a rectangular cutout 26 which completely receives supporting member 11. A mandrel 27 is pressed against supporting member 11 when the supporting member is in cutout 26 to thereby expand the walls of lip 15 and skirt 15' into engagement with cutout 26 to hold the supporting member in place in the mold throughout the molding operation. Mandrel 27 remains in position during the molding operation and can be removed after the bag has been stripped from the mold, raised portion 18 has been removed and the zipper has been opened to gain access to the interior of the bag.

Figure 7:
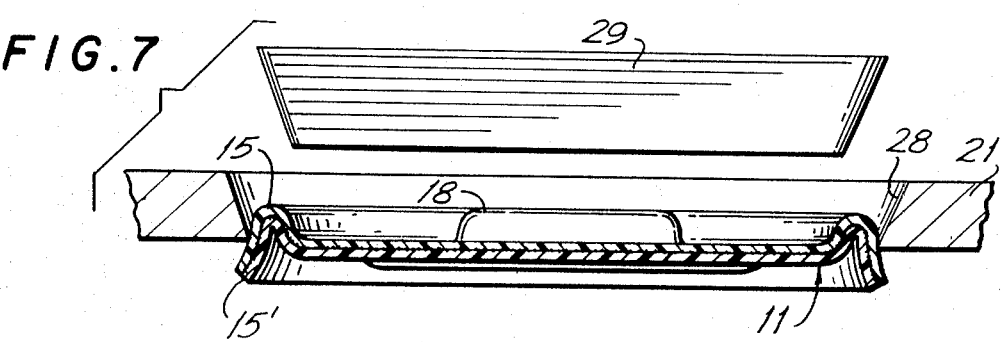
FIG. 7 is an exploded, partial sectional view of another form of mold arrangement showing means for mounting the attachment supporting member in the mold.

Another molding technique is shown in FIG. 7 wherein the mold cavity opens outwardly through a tapered aperture 28. Supporting member 11 is inserted through tapered aperture 28 and a mandrel 29 is pressed against the supporting member to cause lip 15 to frictionally engage the walls of tapered aperture 28 during the molding operation.

The foregoing molding techniques have been described with reference to a zipper secured to a vinyl supporting member. The technique can likewise be used to mold in situ other types of fasteners or other elements. Such elements are first secured to a supporting member which will protect the elements from the plastic as it is flowed and molded on the walls of the mold cavity so as to mold the elements as an integral part of the bag or other article while assuring a neat and clean appearance at the attachment of the element to the bag. With this technique, snap fasteners, handles, and the like can be permanently affixed to the article during the rotational molding of the article.

It will thus be seen that the objects set forth above, among those made apparent from the preceding description, are efficiently attained and, since certain changes may be made in carrying out the above method without departing from the spirit and scope of the invention, it is intended that all matter contained in the above description and shown in the accompanying drawings shall be interpreted as illustrative and not in a limiting sense.

What is claimed is:

1. A method of forming, in a mold having a mold cavity, a hollow article having a closure member through which access to the interior of the hollow article may be had, comprising the steps of:
   a. securing a layer support member to an opening fastener for said hollow article, said support member overlying at least a portion of said fastener which would be exposed to the interior of said hollow article, to thereby define an assembly,
   b. mounting said assembly in said mold cavity with said fastener protected from the interior of said mold cavity by said overlying support member,
   c. introducing a charge of flowable, setable plastic material into said mold cavity,
   d. closing said mold cavity,
   e. rotating said mold to coat the walls thereof and the surface of said support member exposed to the interior thereof with said flowable, setable plastic material,
   f. setting said flowable, setable plastic material to form said hollow article and secure said support member to said hollow article,
   g. arresting rotation of said mold,
   h. opening said mold cavity,
   i. stripping said hollow article from said mold,
   j. opening said fastener, and
   k. removing the portion of said support member overlying said fastener and also removing the portion of said plastic material coating the removed portion of said support member, to permit access to the interior of said hollow article through said fastener.

2. A method of forming a hollow article as claimed in claim 1 wherein said fastener comprises a zipper having zipper tapes and zipper teeth and said support member overlies said zipper as viewed from the interior of said hollow article and is attached to said zipper tapes, said portions of said support member and set plastic material being removed to expose the teeth of said zipper from within said hollow article.

3. A method of forming a hollow article as claimed in claim 2 wherein said support member also overlies said zipper on the side of said zipper that would be exposed exteriorly of said hollow article and including the step of removing the portion of said support member overlying said zipper teeth to expose said zipper teeth exteriorly of said hollow article.

4. A method of forming a hollow article as claimed in claim 1 wherein said support member has a lip and wherein said mold cavity is formed with a mating groove which receives said lip when said support member is mounted in said mold cavity for retaining said support member within said mold during the molding operation.

5. A method of forming a hollow article as claimed in claim 1 wherein said support member has a lip including a skirt extending therefrom and wherein said mold cavity includes a cutout for receiving said support member and including the steps of mounting said assembly in said cutout and applying a mandrel against said support member within said cutout to press the skirt of said support member into engagement with the walls of said cutout prior to introduction of the charge of flowable, setable plastic material, and further including the step of removing said mandrel from the interior of said hollow article after access to the interior thereof has been gained through said fastener.

6. A method of forming a hollow article as claimed in claim 1 wherein said support member has a lip, said mold having a tapered aperture communicating with said mold cavity from the exterior of said mold and including the steps of mounting said assembly in said tapered aperture and applying a mandrel against said assembly within said tapered aperture to press the lip of said support member into engagement with walls of said tapered aperture prior to introduction of said charge of flowable, setable plastic material and removing said mandrel after said plastic material has been set.

* * * * *